United States Patent
Zhu et al.

(10) Patent No.: US 9,835,793 B2
(45) Date of Patent: Dec. 5, 2017

(54) DISPLAY BACKLIGHT WITH ADHESIVE ATTACHMENT LAYERS

(71) Applicant: Apple Inc., Cupertino, CA (US)

(72) Inventors: Xinyu Zhu, Cupertino, CA (US); Jun Qi, Cupertino, CA (US); Po-Wen Chiu, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 14/716,448

(22) Filed: May 19, 2015

(65) Prior Publication Data

US 2016/0077276 A1 Mar. 17, 2016

Related U.S. Application Data

(60) Provisional application No. 62/049,913, filed on Sep. 12, 2014.

(51) Int. Cl.
*F21V 8/00* (2006.01)

(52) U.S. Cl.
CPC .......... *G02B 6/0091* (2013.01); *G02B 6/0068* (2013.01); *G02B 6/0073* (2013.01); *G02B 6/0083* (2013.01)

(58) Field of Classification Search
CPC . G03H 2250/35; G09F 3/10; H01H 2205/026
See application file for complete search history.

(56) References Cited

U.S. PATENT DOCUMENTS

| | | |
|---|---|---|
| 8,917,447 B2 | 12/2014 | Wolk et al. |
| 2008/0285304 A1 | 11/2008 | Rankin, Jr. et al. |
| 2011/0255303 A1 | 10/2011 | Nichol et al. |
| 2012/0026424 A1 | 2/2012 | Youk et al. |
| 2012/0182497 A1* | 7/2012 | Qi ........................ G02B 6/0021 349/62 |
| 2013/0235614 A1 | 9/2013 | Wolk et al. |
| 2015/0146144 A1 | 5/2015 | Yang et al. |
| 2015/0168766 A1* | 6/2015 | Kuk .................. G02F 1/133308 349/58 |

\* cited by examiner

*Primary Examiner* — Elmito Breval
(74) *Attorney, Agent, or Firm* — Treyz Law Group, P.C.; G. Victor Treyz; Vineet Dixit

(57) ABSTRACT

A display may have a backlight. The display backlight may have a light guide plate. An array of light-emitting diodes may emit light into the edge of the light guide plate. The array of light-emitting diodes may be mounted to a flexible printed circuit. A layer of adhesive tape may attach the light guide plate to the flexible printed circuit. The tape layer may have upper and lower adhesive layers on a carrier film. The carrier film may be formed from a metal-coated polymer layer, a high-low dielectric stack, a metal foil, or other reflective or non-reflective structures. A stiffener may be provided to facilitate handling of the adhesive tape.

24 Claims, 8 Drawing Sheets

DISPLAY BACKLIGHT WITH ADHESIVE ATTACHMENT LAYERS

This application claims the benefit of provisional patent application No. 62/049,913, filed Sep. 12, 2014, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Some displays such as liquid crystal displays may be provided with backlight illumination from a backlight. The backlight allows the display to be used in a variety of lighting conditions.

Display backlights are often provided with light using arrays of light-emitting diodes soldered to a flexible printed circuit. The light-emitting diodes emit light into an edge of the light guide plate. The light guide plate laterally distributes light from the light-emitting diodes across the display. Scattering features on the light guide plate scatter the light upwards through the display to serve as backlight for the display.

Backlight structures such as light guide plates may be mounted within device housings using adhesive tape. If care is not taken, the tape may create visible display artifacts by absorbing or scattering light from the light-emitting diodes or the tape may be too weak to hold structures together within the display.

It would therefore be desirable to be able to provide improved arrangements for securing structures within display backlight.

SUMMARY

A display may have an array of pixels that display images for a user. The display may have a backlight for providing backlight illumination for the array of pixels.

The display backlight may have a light guide plate. An array of light-emitting diodes may emit light into the edge of the light guide plate. The light guide plate may have light scattering features that scatter light from the light guide plate outwards through the array of display pixels.

The array of light-emitting diodes may be mounted to a flexible printed circuit. A layer of adhesive tape may attach the light guide plate to the flexible printed circuit. The tape may have upper and lower adhesive layers on a carrier film. The thickness of the lower adhesive layer may be greater than the thickness of the upper adhesive layer. The carrier film may be formed from a metal-coated polymer layer, a high-low dielectric stack, or a metal foil. A stiffener layer may be provided to facilitate handling of the adhesive tape.

DETAILED DESCRIPTION

Electronic devices may include displays. The displays may be used to display images to a user. Illustrative electronic devices that may be provided with displays are shown in FIGS. 1, 2, 3, and 4.

Figure 1:
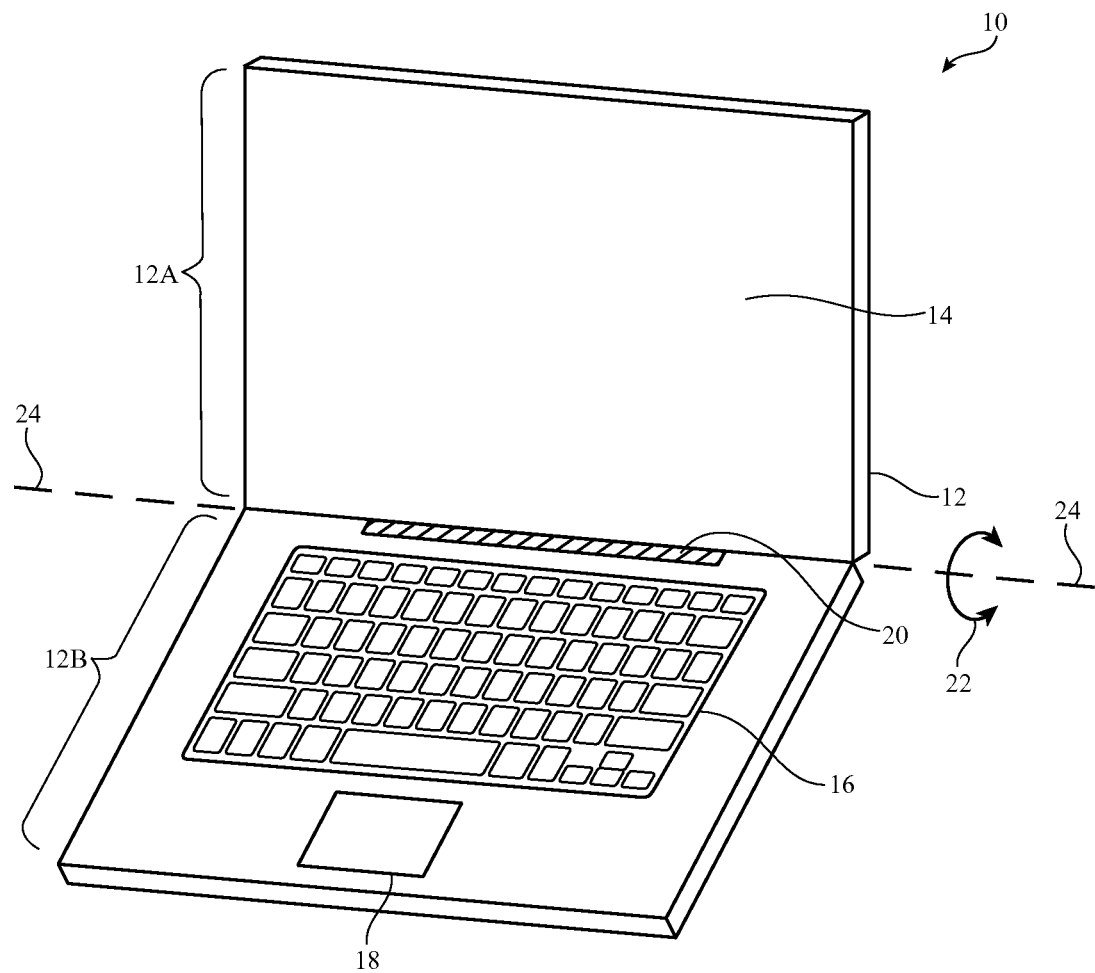
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
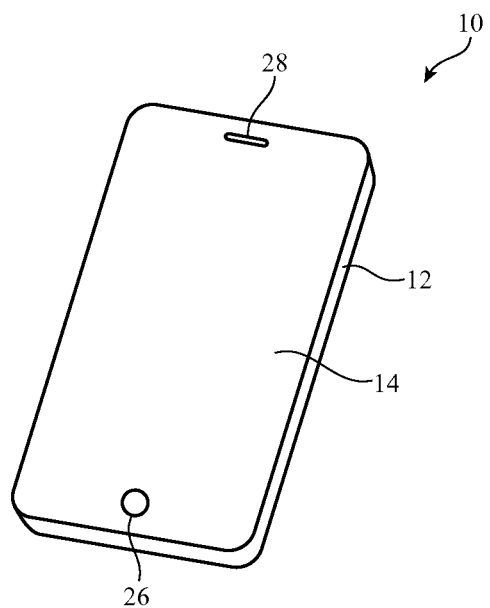
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
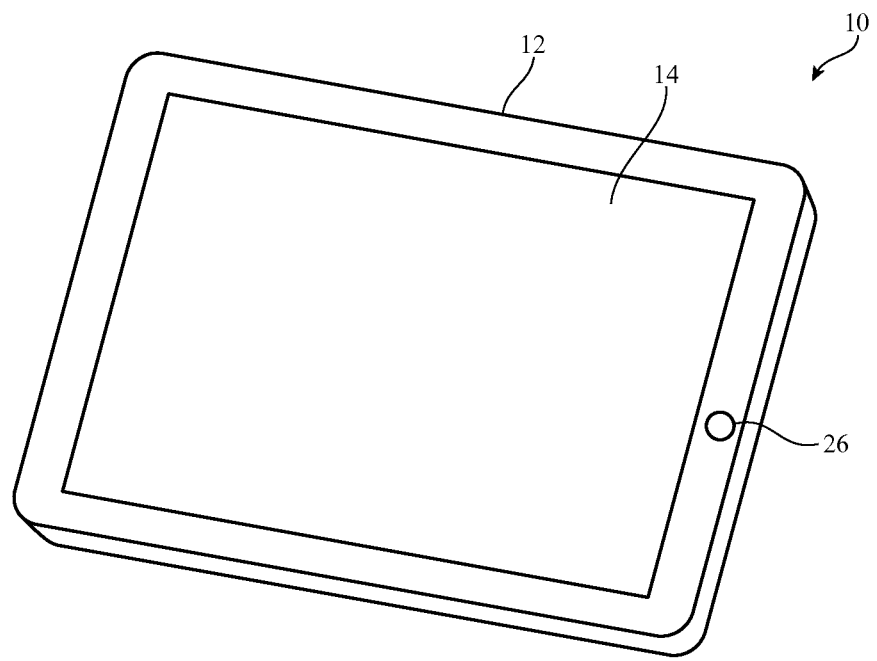
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
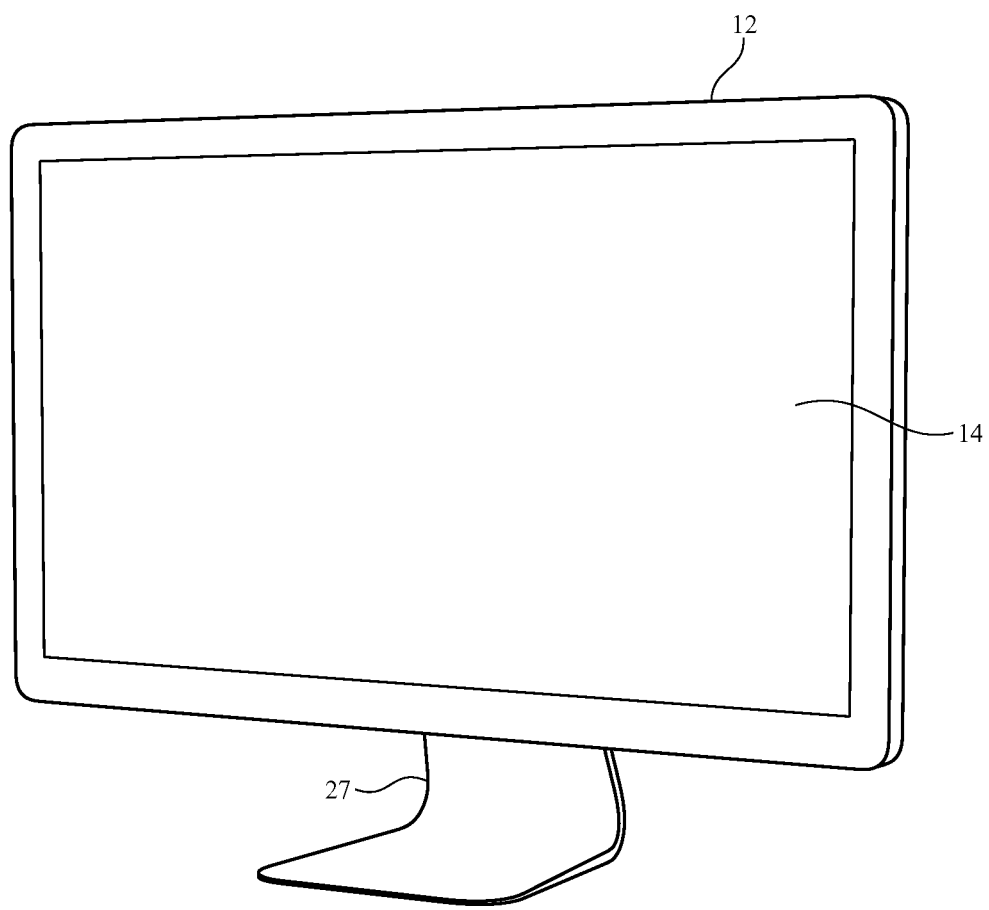
FIG. 4 is a perspective view of an illustrative electronic device such as a computer display with display structures in accordance with an embodiment.

FIG. 4 shows how electronic device 10 may be a computer display, a computer that has been integrated into a computer display, or other display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components, organic light-emitting diodes, or other suitable pixel structures. Configurations based on liquid crystal displays are sometimes described herein as an example.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
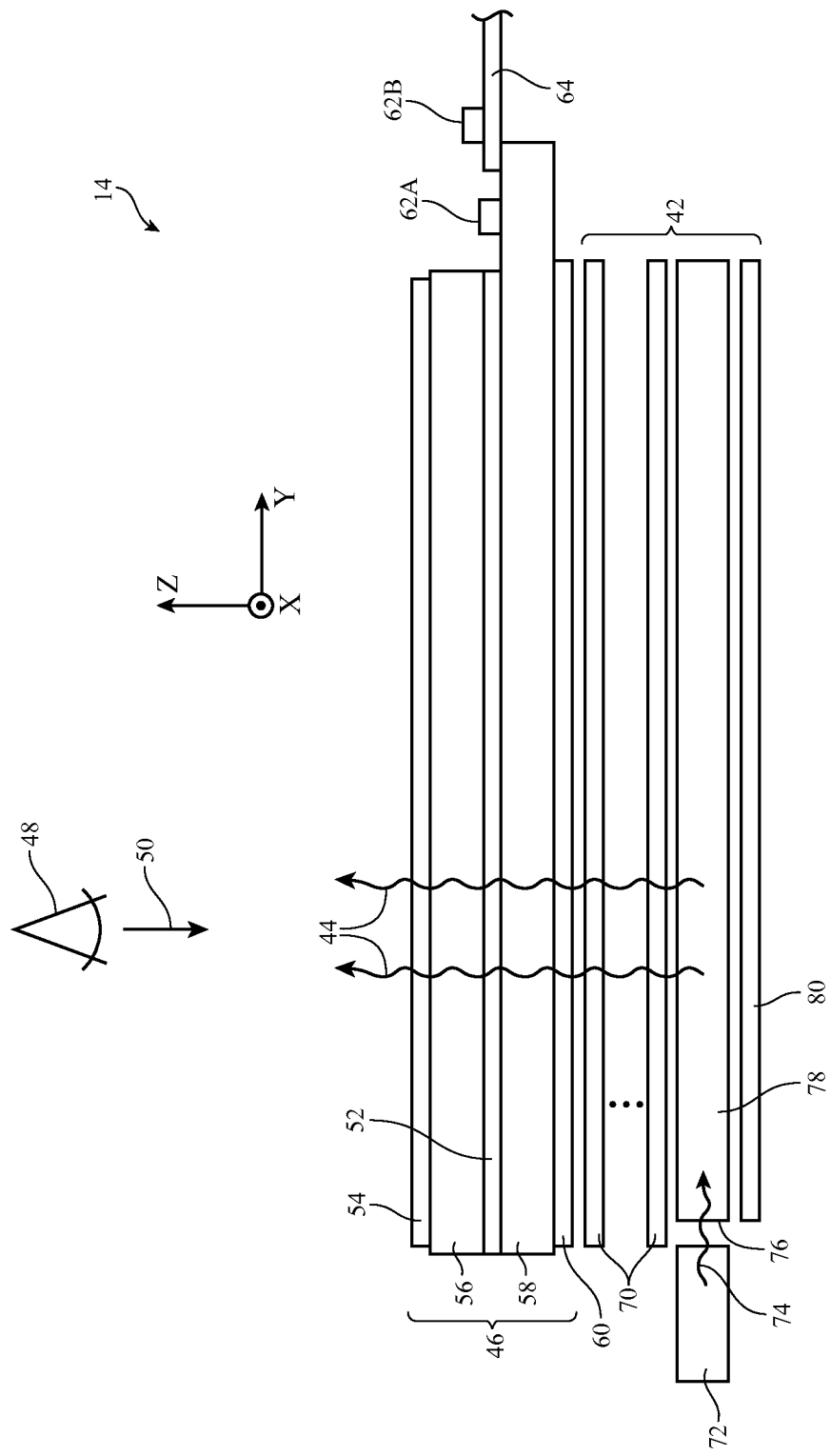
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide plate 78. Light guide plate 78 may be a molded plastic light guide plate or a thin flexible plastic light guide film or may be formed from other transparent materials such as clear glass. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. If desired, some of optical films 70 may be incorporated into other layers in display 14. For example, a compensation layer may be incorporated into a polarizer layer, etc. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Backlight unit 42 may be mounted in housing 12 using adhesive, fasteners, or other attachment mechanisms. The structures of backlight unit 42 may also contain adhesive tape structures to help hold layers of backlight unit together. A tape layer may have layers of adhesive and a carrier layer that are configured to improve optical performance (e.g., to minimize visible artifacts on the display) while ensuring satisfactory mechanical performance.

Figure 6:
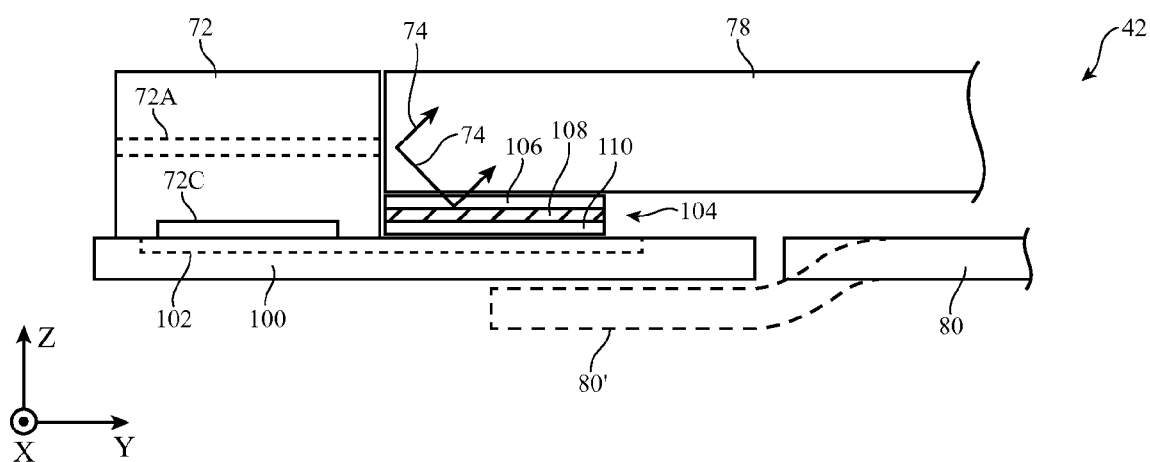
FIG. 6 is a cross-sectional side view of an illustrative display having a layer of adhesive interposed between a light guide plate and a flexible printed circuit to which light-emitting diodes for a backlight have been mounted in accordance with an embodiment.

A cross-sectional side view of an illustrative configuration for backlight unit 42 that incorporates a tape layer is shown in FIG. 6. As shown in FIG. 6, light source 72 (e.g., an array of light-emitting diodes extending along dimension X) may have electrical contacts 72C that are soldered to metal traces 102 on printed circuit 100. Printed circuit 100 may be a flexible printed circuit (e.g., a printed circuit formed from a flexible polyimide substrate or a substrate formed from other flexible polymer layers). Flexible printed circuit 100 may use traces 102 to distribute power to the array of light-emitting diodes that are coupled to flexible printed circuit 100. Tape layer 104 may be used to attach flexible printed circuit 100 to light guide plate 78. This ensures that the light-emitting diodes of source 72 will remain adjacent to the edge of light guide plate 78.

Each light-emitting diode may have an active area 72A that emits light 74 into the adjacent edge of light guide plate 78. Some of light 74 travels at an upward angle. Other light 74 travels at a downward angle and strikes tape layer 104. Some of light 74 that is angled downward and that strikes tape 104 will be reflected upwards into light guide plate 78. The configuration of the adhesive layers and choice of carrier structure used in tape 104 may help avoid undesirable visible artifacts on display 14 due to uneven backlight distribution.

Reflector 80 may be formed under light guide plate 78 to help reflect backlight upwards in direction Z. As shown by portion 80', reflector 80 may, if desired, have an edge that protrudes under flexible printed circuit 100. The edge of reflector 80 may also protrude above part of flexible printed circuit 100 (i.e., on the opposite side of portion 80' of FIG. 6).

Tape 104 may have upper adhesive layer 106, a carrier 108, and lower adhesive layer 110. Carrier 108 may be formed from a layer of polymer and/or other materials. With one suitable arrangement, carrier 108 may be formed from reflective structures that reflect light 74 (i.e., carrier 108 may be a reflective carrier).

Downwardly angled light 74 may reflect off of carrier 108 after passing through upper adhesive layer 106. To minimize light loss in layer 106, upper adhesive layer 106 is preferably relatively thin and is formed from a clear material (e.g., optically clear pressure sensitive adhesive). Lower adhesive layer 110 may be formed from the same type of adhesive as upper adhesive layer 106 or may be formed from other adhesives. For example, because lower adhesive layer 110 is out of the optical path of light 74, lower adhesive layer 110 may be formed from an adhesive that is less transmissive (less transparent) than upper layer 106. In general, adhesive material of layer 110 may be formed from opaque adhesive, adhesive that is not optically clear, adhesive that absorbs more light than the adhesive of layer 106, an adhesive material that is stronger per unit volume than the adhesive material of layer 106, or other types of adhesive that are not the same as adhesive 106.

Traces 102 on flexible printed circuit 100 create ridges and other protrusions on the surface of flexible printed circuit 100. The rough surface formed by the ridges can be smoothed out by using a sufficiently thick adhesive layer when forming layer 110. Use of a relatively thick adhesive layer when forming layer 110 helps ensure that the adhesive bond being made to flexible printed circuit 100 will have satisfactory mechanical strength and can therefore withstand damage in the event that device 10 is dropped or otherwise subjected to large stresses.

Figure 7:
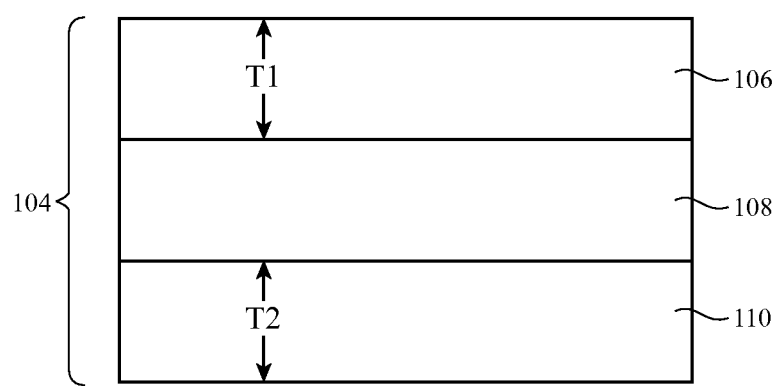
FIG. 7 is a cross-sectional side view of an illustrative adhesive tape structure in accordance with an embodiment.

A cross-sectional side view of tape 104 is shown in FIG. 7. As shown in FIG. 7, tape 104 may be characterized by upper and lower adhesive layers that have different respective thicknesses T1 and T2. For example, upper adhesive layer 106 may have a thickness of T1 of 18 microns, whereas lower adhesive layer 110 may have a thickness of 34 microns. Other thicknesses may be used for layers T1 and T2 if desired (e.g., 5-25 microns, more than 8 microns, 10-20 microns, 20-40 microns, more than 30 microns, less than 40 microns, less than 100 microns, etc.). To minimize optical disturbances in light 74, layer T1 is preferably relatively thin, whereas layer T2 is preferably relatively thick to ensure strong mechanical strength in the bond being made over the rough surface of flexible printed circuit 100. With one suitable arrangement for tape 104, upper layer thickness T1 is smaller than lower layer thickness T2. This is, however, merely illustrative. Thicknesses T1 and T2 may have other suitable values, if desired.

The ability of tape 104 to reflect light 74 can be enhanced by using reflective structures in forming carrier layer 108. Illustrative arrangements for forming carrier layer 108 are shown in FIGS. 8, 9, and 10.

Figure 8:
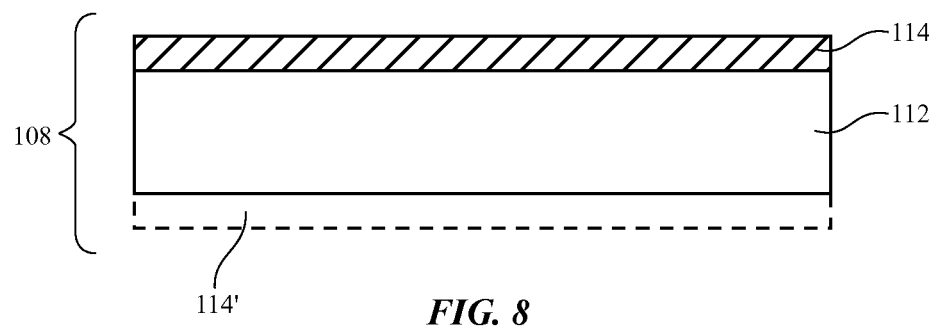
FIG. 8 is a cross-sectional side view of an illustrative carrier layer that may be used in the adhesive tape of FIG. 7 in a configuration in which the carrier layer has a reflective metal layer on a polymer layer in accordance with an embodiment.

In the example of FIG. 8, reflective carrier layer 108 has a flexible carrier film such as layer 112. Film 112 may be formed from a flexible polymer layer or other substrate. An example of a polymer that may be used in forming film 112 is polyethyleneterephthalate (PET). Other polymers may be used if desired (e.g., polyimide, cellulose triacetate, polycarbonate, etc.). Reflective coating 114 may be formed on carrier film 112. For example, reflective coating 114 may be formed on the upper surface of carrier film 112. Reflective coating 114 may be formed from a shiny metal coating such as a layer of silver, a layer of aluminum, layers of silver and aluminum (with silver on top or aluminum on top), alloys of silver and aluminum, other elemental metal layers, other metal alloys and combinations of these materials. Metal coating 114 may be deposited by physical vapor deposition, by electroplating or other electrochemical deposition techniques, by chemical vapor deposition, by laminating a metal foil to carrier film 112 with heat and pressure, or other suitable techniques. If desired, the surface of metal coating 114 may be coated with a polymer or inorganic dielectric layer or other material to help prevent oxidation of metal layer 114, to promote adhesion with adhesive, etc.

Layer 112 has opposing first and second surfaces (e.g., upper and lower surfaces). Layer 114 may be formed on the upper surface of layer 112. The opposing lower surface of layer 114 may be left uncoated or an additional coating layer (i.e., layer 114' of FIG. 8) may be formed on the lower surface of layer 112. Layer 114' may be a metal coating layer (e.g., a layer such as metal coating 114) or other suitable coating (polymer, inorganic dielectric, etc.). Layer 114' may have the same thickness as layer 114 or may have a different thickness and may be used to help equalize stresses when layer 108 expands and contracts due to variations in temperature. The presence of layer 114' on the lower surface of layer 112 may therefore help balance stresses created by the presence of layer 114 and help prevent warping of carrier 108.

Figure 9:
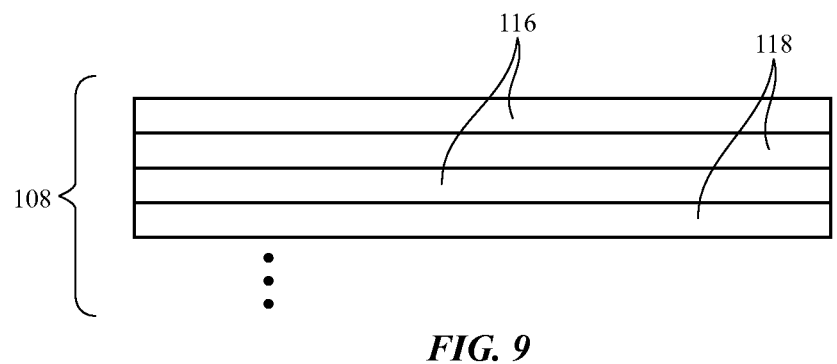
FIG. 9 is a cross-sectional side view of an illustrative carrier layer that may be used in the adhesive tape of FIG. 7 in a configuration in which the carrier layer is a reflective layer formed from dielectric layers of alternating different indices of refraction in accordance with an embodiment.
Figure 10:
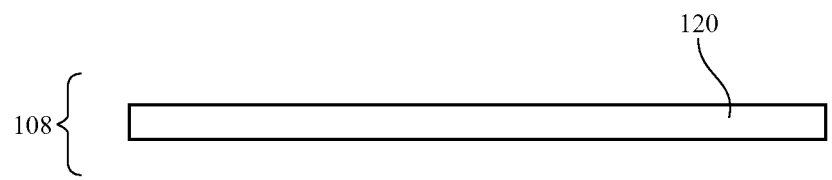
FIG. 10 is a cross-sectional side view of an illustrative carrier layer that may be used in the adhesive tape of FIG. 7 in a configuration in which the carrier layer been formed from a layer of reflective material such as metal foil in accordance with an embodiment

In the example of FIG. 9, reflective carrier layer 108 has been formed from a stack of alternating materials. Layers 116 are clear dielectric layers having a first index of refraction and alternating layers 118 are clear dielectric layers having a second index of refraction that is different than the first index of refraction. There may be any suitable number of layers 116 and 118 in carrier layer 108 (e.g., 2-50 layers, more than 4 layers, fewer than 10 layers, etc.). Because the index of refractions of layers 116 and 118 are different, configurations of the type shown in FIG. 9 are sometimes referred to as high-low dielectric stacks. By selecting the layer thicknesses and indices of refraction for layers 116 and 118, carrier layer 108 of FIG. 9 may be made highly reflective. If desired, optical stacks with different numbers of different index of refraction materials may be used (e.g., stacks that include three or four different types of layers). The configuration of FIG. 9 is merely illustrative. Layers 116 and 118 may be formed from polymer layers (e.g., layers of PET, polyimide, etc.), may be formed from inorganic dielectrics (e.g., silicon oxide, silicon nitride, metal oxides, or other layers of the type that may be formed as coatings on polymer films), or may be formed from other suitable layers.

In the example of FIG. 10, reflective carrier layer 108 has been formed from a single layer of metal foil such as foil layer 120. Foil 120 may be formed from aluminum (e.g., a 6 micron thick layer of aluminum, a layer of aluminum that is 4-10 microns thick, a layer of aluminum more than 3 microns thick, a layer of aluminum that is less than 15 microns thick, etc.). Foil 120 may also be formed from one or more other layers of elemental metals and/or metal alloys.

If desired, other stacks of one or more materials may be used in forming carrier layer 108, combinations of the arrangements of FIGS. 8, 9, and 10 and/or other arrangements may also be used. Carrier layer 108 may also be formed from other materials such as clear plastic, white plastic, etc.

Figure 11:
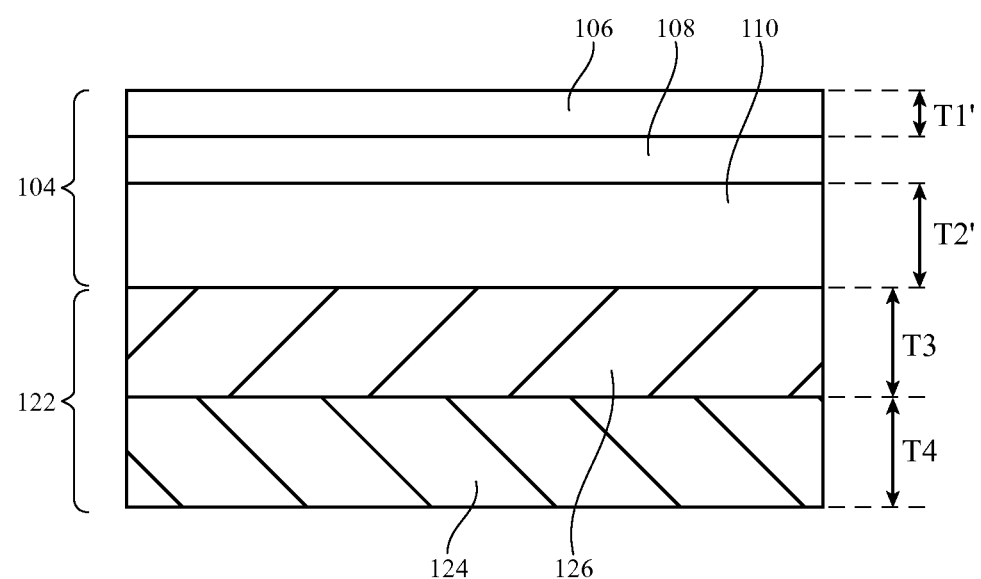
FIG. 11 is a cross-sectional side view of an illustrative tape layer of the type shown in FIG. 7 mounted to a stiffener layer in accordance with an embodiment.

If desired, a stiffener may be added to layer 104. As shown in FIG. 11, layers 122 may be attached to the lower surface of tape 104 to form a stiffened tape layer. Layers 112 may include stiffener layer 126 of thickness T3 and adhesive layer 124 of thickness T4. Stiffener 126 may help stiffen layer 104 to facilitate handling of layer 104. Adhesive layer 124 may form the lower adhesive layer for the stiffened tape layer of FIG. 11. Lowermost adhesive layer 110 in layer 104 is used to attach layer 104 to layer 126 in the tape configuration of FIG. 11. Thickness T3 of layer 126 may be 12 microns (or more than 5 microns or less than 25 microns or other suitable thickness) and thickness T4 may be 34 microns (or more than 20 microns, less than 50 microns, 10-40 microns, or other suitable thickness). The thickness T1' of upper adhesive layer 106 may be 14 microns (or more than 5 microns, or less than 25 microns, or other suitable thickness). Carrier layer 108 in layer 104 of FIG. 11 may be a metal foil, may be a dielectric stack with alternating high and low index or refraction materials, or may be a metal-coated polymer film or other reflective layer. The thickness of the carrier layer may be 6 microns or more than 3 microns, less than 11 microns, or other suitable thickness. Lower adhesive layer 110 in layer 104, which is interposed between carrier layer 108 and layer 126 may have a thickness T2' of 12 microns or more than 10 microns, less than 15 microns, or other suitable thickness.

The foregoing is merely illustrative and various modifications can be made by those skilled in the art without departing from the scope and spirit of the described embodiments. The foregoing embodiments may be implemented individually or in any combination.

What is claimed is:

1. A display backlight, comprising:
    a light guide plate;
    a light source having an array of light-emitting diodes mounted on a flexible printed circuit, wherein the light-emitting diodes emit light into the light guide plate; and
    a tape layer that attaches the light guide plate to the flexible printed circuit, wherein the tape layer has a carrier layer, an upper adhesive layer that attaches the carrier layer to the light guide plate, and a lower adhesive layer that attaches the carrier layer to the flexible printed circuit, wherein the upper adhesive layer is thinner than the lower adhesive layer.

2. The display backlight defined in claim 1 wherein the carrier layer comprises a reflective carrier layer.

3. The display backlight defined in claim 2 wherein the reflective carrier layer has a polymer layer.

4. The display backlight defined in claim 3 wherein the reflective carrier layer further comprises a metal coating on the polymer layer.

5. The display backlight defined in claim 3 wherein the polymer layer has opposing first and second surfaces and wherein the reflective carrier layer further comprises a first metal coating on the first surface and a second metal coating on the second surface.

6. The display backlight defined in claim 2 wherein the reflective carrier layer comprises a plurality of dielectric layers with alternating different first and second indices of refraction.

7. The display backlight defined in claim 2 wherein the reflective carrier layer comprises a metal layer.

8. The display backlight defined in claim 2 wherein the reflective carrier layer is a layer of metal foil.

9. A display backlight, comprising:
    a light guide plate;
    a light source having an array of light-emitting diodes mounted on a flexible printed circuit, wherein the light-emitting diodes emit light into the light guide plate;
    a first adhesive layer on the light guide plate;
    a second adhesive layer; and
    a reflective carrier layer between the first and second adhesive layers.

10. The display backlight defined in claim 9 further comprising a third adhesive layer attached to the flexible printed circuit.

11. The display backlight defined in claim 10 wherein the third adhesive layer is thicker than the first adhesive layer.

12. The display backlight defined in claim 11 further comprising a polymer stiffener layer attached between the second and third layers of adhesive.

13. The display backlight defined in claim 12 wherein the reflective carrier layer comprises:
    a polymer layer; and
    a metal coating on the polymer layer, wherein the first adhesive layer is attached to the metal coating.

14. The display backlight defined in claim 12 wherein the reflective carrier layer comprises a plurality of dielectric layers with alternating different first and second indices of refraction.

15. The display backlight defined in claim 12 wherein the reflective carrier layer comprises a metal layer.

16. The display backlight defined in claim 12 wherein the reflective carrier layer is a layer of metal foil.

17. The display backlight defined in claim 9 wherein the reflective carrier layer comprises:
   a polymer layer with opposing first and second surfaces;
   a first metal coating on the first surface; and
   a second metal coating on the second surface.

18. A display backlight, comprising:
   a light guide layer;
   a light source having an array of light-emitting diodes mounted on a flexible printed circuit, wherein the light-emitting diodes emit light into the light guide layer; and
   a first adhesive layer on the light guide layer;
   a second adhesive layer that is thicker than the first adhesive layer; and
   a carrier layer between the first and second adhesive layers.

19. The display backlight defined in claim 18 further comprising:
   a third layer of adhesive that is attached to the flexible printed circuit; and
   a stiffener layer between the second layer of adhesive and the third layer of adhesive.

20. The display backlight defined in claim 18 wherein the second adhesive layer is attached to the flexible printed circuit and wherein the carrier layer comprises:
   a polymer film; and
   a metal coating on the polymer film.

21. The display backlight defined in claim 18 wherein the second adhesive layer is attached to the flexible printed circuit and wherein the carrier layer comprises:
   a polymer film having opposing first and second surfaces;
   a first metal coating on the first surface of the polymer film; and
   a second metal coating on the second surface of the polymer film.

22. The display backlight defined in claim 18 wherein the second adhesive layer is attached to the flexible printed circuit and wherein the carrier layer comprises dielectric layers with alternating different first and second indices of refraction.

23. The display backlight defined in claim 18 wherein the second adhesive layer is attached to the flexible printed circuit and wherein the carrier layer is a layer of metal foil.

24. The display backlight defined in claim 18 wherein the first and second layers of adhesive are formed from different adhesive materials and wherein the first layer of adhesive is more transmissive than the second layer of adhesive.

* * * * *